(12) United States Patent
Dillen

(10) Patent No.: US 8,843,842 B2
(45) Date of Patent: Sep. 23, 2014

(54) METHOD OF SELECTING AT LEAST ONE OF A COLLECTION OF CONTENT ITEMS

(75) Inventor: Paulus Henricus Antonius Dillen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 858 days.

(21) Appl. No.: 12/680,583

(22) PCT Filed: Sep. 25, 2008

(86) PCT No.: PCT/IB2008/053904
§ 371 (c)(1),
(2), (4) Date: Mar. 29, 2010

(87) PCT Pub. No.: WO2009/044315
PCT Pub. Date: Apr. 9, 2009

(65) Prior Publication Data
US 2010/0218133 A1    Aug. 26, 2010

(51) Int. Cl.
*G06F 3/048* (2013.01)
*G06F 17/30* (2006.01)

(52) U.S. Cl.
CPC .... *G06F 17/30752* (2013.01); *G06F 17/30755* (2013.01); *G06F 17/30743* (2013.01)
USPC ........................................................ 715/771

(58) Field of Classification Search
USPC ......... 715/243, 244, 253, 277, 716–729, 744, 715/745, 747, 764, 766, 788, 789, 794, 806, 715/807, 810, 811, 815, 821, 822, 825, 837
See application file for complete search history.

(56) References Cited

U.S. PATENT DOCUMENTS

| | | | |
|---|---|---|---|
| 7,028,082 B1* | 4/2006 | Rosenberg et al. | 709/223 |
| 7,216,008 B2* | 5/2007 | Sakata | 700/94 |
| 7,279,629 B2* | 10/2007 | Hinman et al. | 84/615 |
| 7,650,570 B2* | 1/2010 | Torrens et al. | 715/727 |
| 8,316,299 B2* | 11/2012 | Asaka et al. | 715/716 |
| 2006/0112335 A1* | 5/2006 | Hofmeister et al. | 715/701 |
| 2007/0085840 A1 | 4/2007 | Asaka et al. | |

(Continued)

FOREIGN PATENT DOCUMENTS

| CN | 1991728 A | 7/2007 |
|---|---|---|
| JP | H01191933 A | 8/1989 |

(Continued)

OTHER PUBLICATIONS

Pampalk et al: "Content-Based Organization and Visualization of Music Archives"; Proceedings of the 10th International ACM Conference on Multimedia, 2002, Conference 10, December 1, 2002, pp. 570-579.

(Continued)

*Primary Examiner* — Enrique Iturralde

(57) ABSTRACT

Data indicative of membership of at least one of a plurality of content classes is made available for each one of a collection of content items. A method of selecting at least one item includes displaying a representation of sections of a geometrical construct occupying an at least one-dimensional space. The geometrical construct is partitioned into sections in accordance with a mapping between the at least one-dimensional space and a domain of the data indicative of class membership, such that each section represents a class. A signal defining a sub-space within the space is received, and the mapping is used to effect a selection of at least one item of content data commensurate with the defined sub-space.

12 Claims, 3 Drawing Sheets

(56) References Cited

U.S. PATENT DOCUMENTS

| | | | |
|---|---|---|---|
| 2007/0233726 A1* | 10/2007 | Torrens et al. | 707/102 |
| 2008/0065622 A1* | 3/2008 | Goto et al. | 707/5 |
| 2008/0086687 A1* | 4/2008 | Sakai et al. | 715/716 |

FOREIGN PATENT DOCUMENTS

| | | | |
|---|---|---|---|
| WO | 2006005533 A2 | 1/2006 |
| WO | 2006040710 A1 | 4/2006 |
| WO | 2006050731 A2 | 5/2006 |
| WO | 2007000741 A2 | 1/2007 |
| WO | 2007044389 A2 | 4/2007 |

OTHER PUBLICATIONS

Rao et al: "Handbook of Statistics 24:Data Mining and Data Visualization"; Feb. 2005M Elsevier Publishing, pp. 471-475.

* cited by examiner

METHOD OF SELECTING AT LEAST ONE OF A COLLECTION OF CONTENT ITEMS

FIELD OF THE INVENTION

The invention relates to a method of selecting at least one of a collection of items of content data.

The invention also relates to a system for selecting at least one of a collection of items of content data.

The invention also relates to a computer program.

BACKGROUND OF THE INVENTION

WO 2007/044389 discloses a method and apparatus for visualizing a music library. A disk visualization is divided into different sectors that represent each genre of the library. The size of each sector may be proportional to the number of media items of the associated genre with respect to the whole library. Media items may be depicted as marks and can be arranged within the disk visualization according to the media item's categorization. Playlists may be created by adding media items in a one-by-one manner, or they could be smart playlists following a set of logical filtering criteria.

A problem of the known method and system is that the one-by-one selection of media items is laborious and requires a data processing system to process a corresponding number of selection commands. To indicate a complex preference that does not correspond to a particular one of a number of classes requires the use of multiple filters, which a user would have to set separately.

SUMMARY OF THE INVENTION

It is an object of the invention to provide a method, system and computer program of the types defined in the opening paragraphs that allow for efficient selection of items of content data in accordance with a user's preference expressed as a combination of pre-determined classes.

This object is achieved by the method of selecting at least one of a collection of items of content data according to the invention, wherein data indicative of membership of at least one of a plurality of content classes is available for each item of content data, which method includes:

displaying a representation of sections of a geometrical construct occupying an at least one-dimensional space, wherein the geometrical construct is partitioned into sections in accordance with a mapping between the at least one-dimensional space and a domain of the data indicative of class membership, such that each section represents a class;

receiving a signal defining a sub-space within the space; and using the mapping to effect a selection of at least one item of content data commensurate with the defined sub-space.

Because the sub-space can overlap with more than one of the sections and each section represents a class, the signal defining the sub-space is usable to indicate a preference expressed as a combination of classes. The mapping is used in a data processing system to translate between data indicative of class membership and the domain of geometrical data. It is therefore possible to select one or more items of content data in accordance with the combination of classes, either because the item or items of content data is itself or are themselves associated with these classes through membership functions, or because a plurality of items of content data forms an ensemble that is a combination of classes. The method is efficient, because an intuitive interface is provided that allows concurrent selection of multiple classes.

An embodiment of the method includes displaying a representation of at least one second geometrical construct overlaid on the sections, and obtaining the signal defining the sub-space by providing a Graphical User Interface for adapting at least one of shape, size and position of the second geometrical construct.

An effect is to allow a user to select a combination of classes in an easy intuitive way. It is possible to express a preference for a (weighted) combination of classes intuitively, since the user can see the representation of the second geometrical construct or constructs. By altering the overlap with the section representing classes, a preference for a combination of classes can be expressed relatively easily.

In an embodiment, the partitioning and representation of the sections are such that the sections are represented as arranged tangentially around a central spot.

An effect is that the number of second geometrical constructs used to express a preference for a combination of classes can be kept relatively low, preferably at one. It is possible to adapt at least one of shape, size and position of the second geometrical construct, such that it covers mostly the sections representing classes in the preferred combination but not other sections. This would not be possible if the sections were arranged linearly, for example, because sections representing classes and located at the ends of the line could not be covered by one second geometrical construct without also the sections in between being covered.

An embodiment, wherein data indicative of membership function values for each class is available for each item of content data, includes analyzing the data for a plurality of items of content data in the collection to identify correlations between membership function values of classes, and assigning the sections to the classes so as to maximize the probability that combinations of classes of which the membership functions are most likely to have the highest combination of values for any item of content data are assigned to adjacent sections.

This embodiment further facilitates the selection of a combination of classes to the exclusion of others, because it decreases the likelihood that a user would want to position the second geometrical construct over sections separated by sections representing undesired classes.

An embodiment, wherein data indicative of membership function values for each class is available for each item of content data, includes associating with each second construct values for mapping to a set of values indicating degrees of membership of at least those classes represented by sections on which the second construct is overlaid and selecting items of content data determined to have membership function values corresponding most closely to the values associated with the second construct or constructs.

Thus, a selection is made of items of content data that are not strictly classified into one of a number of classes, but are provided with data indicating that they have properties more or less strongly associated with a plurality of classes. That is to say that data indicating numerical results of applications of classifiers associated with the respective classes to the item of content data is used, or that data comprised of a set of values indicating the probabilities that the item of content data is a member of the respective classes is used. The same features allow a user to express a preference for a combination of classes in the sense that the preference is for items of content data having properties associated with several classes. The selected items of content data each correspond as closely as possible to the preference expressed.

An embodiment of the method includes determining values for mapping to a set of membership function values for a plurality of classes according to one of:

a position of a centroid of the second geometrical construct relative to the sections and degrees of overlap between the second geometrical construct(s) and the sections on which the representation of the second geometrical construct is overlaid.

An effect is that a preference for a weighted combination of classes can be expressed. A user can indicate a combination of weighting factors by varying the size and/or position of only one second geometrical construct in an intuitive manner. This is because the user is able to compare the representation of the second geometrical construct with the representation of the sections.

In an embodiment, the geometrical construct is partitioned into a number of sections corresponding to classes of which at least a minimum number of items of content data in the collection have at least a minimum degree of membership.

It is thus avoided that a preference is expressed for classes not represented by any items of content data in the collection. Thus, in a data processing system unnecessary input of data is avoided, as are unnecessary searches and repeats of selection commands.

In an embodiment, the geometrical construct and space occupied by it are two-dimensional.

An effect is that the representation of a segment is not obscured by the representation of any other segments (as would be the case if the geometrical construct and space were to be three-dimensional). A further effect is to make it easier to define the sub-space so as to coincide with only certain ones of the segments but not others.

According to another aspect, the system for selecting at least one of a collection of items of content data according to the invention has access to data indicative of membership of at least one of a plurality of content classes for each item of content data, the system is configured to generate a geometrical construct, occupying an at least one-dimensional space and partitioned into sections in accordance with a mapping between the at least one-dimensional space and a domain of the data indicative of class membership, such that each section represents a class, the system including an interface to a display device for causing the display device to display a representation of the sections of the geometrical construct and a user interface for obtaining a signal defining a sub-space within the space, and the system is configured to use the mapping to effect a selection of at least one item of content data commensurate with the defined sub-space.

By enabling the definition of a sub-space coinciding with certain ones of the segments representing classes, a preference for a combination of classes can be expressed as a selection criterion in an easy and relatively efficient manner.

An embodiment of the system is configured to carry out a method according to the invention.

According to another aspect of the invention, there is provided a computer programme including a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the accompanying drawings, in which.

DETAILED DESCRIPTION OF THE EMBODIMENTS

Figure 1:
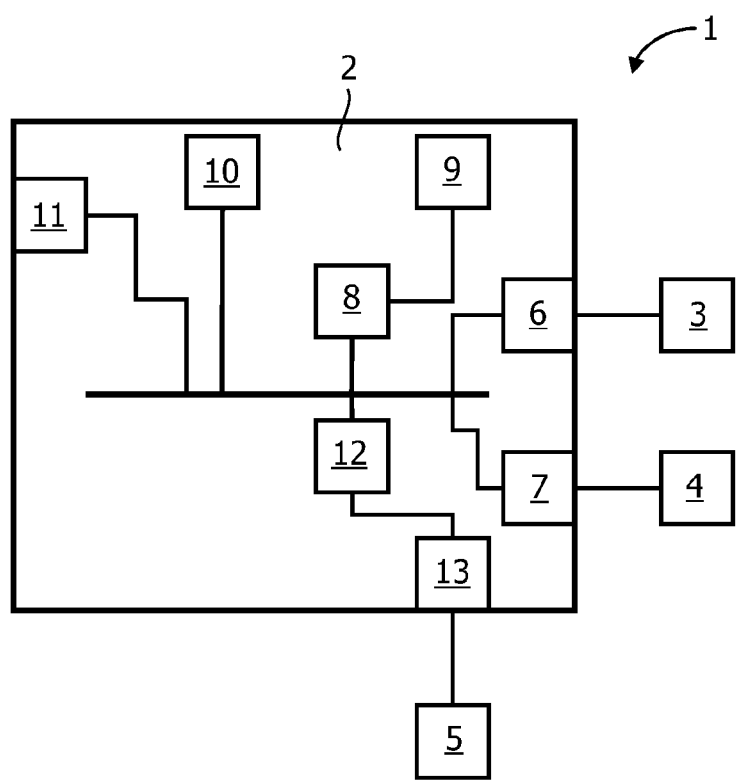
FIG. 1 is a block diagram of a system for providing a user interface enabling the selection of items of digital data in a collection.

A data processing system 1 includes a data processing device 2, a display device 3, a user input device 4 and a speaker system 5. The data processing device 2 can be a personal computer, a game console, an entertainment console, a mobile data processing device such as a personal digital assistant (PDA) or cellular telephone handset, or a portable media player for rendering in perceptible form compressed audio and/or video data, for example. In the illustrated data processing system 1, the display device 3 is connected to a video output interface 6 of the data processing device 2. The user input device 4 is arranged to provide input data signals to the data processing device 2 via an input data interface 7 of the latter. In an alternative embodiment, the display device 3 is integrated into a housing of the data processing device 2. In another alternative embodiment, the user input device 4 and display device 3 are integrated into a single device, such as a touch screen. It is observed that the user input device 4 is representative of a class of devices, some or all of which may be present, including a keyboard, mouse, joystick, stylus, etc.

The data processing device 2 further includes a central processing unit 8, main memory 9 and a data storage device 10 for storing items of content data such as audio files, video files, files including an executable code, word processing files, etc. In the following, methods of selecting items of content data will be explained using the example of audio files. The data processing device 2 includes a network interface 11 for obtaining audio files from an external system over a network, e.g. the Internet. It further includes a digital signal processor 12 and audio output stage 13 for rendering the audio signals represented by the data in the audio files in perceptible form using the speaker system 5.

The data processing system 1 is configured for carrying out a method of selecting at least one of a collection of items of content data by means of suitable software installed on the data processing device 2. The collection of items of content data can include items of content data stored on an external system accessible through a network and the network interface 11, as well as items of content data stored on the data storage device 10.

The method makes use of data indicative of membership of at least one of a plurality of classes. The data may be included as metadata (descriptive data) stored in association with the items of content data. In one embodiment, the data processing device 2 first obtains the data indicative of class membership. Such data may be obtained from an external source, using the network interface 11, e.g. by submitting identifiers of the items of content data to the external source and receiving the classification data in return. In another embodiment, use is made of feature vectors, i.e. numerical values or elements of an ordered set on which a distance measure can be defined. In particular, at least some of the parameter values may be obtainable by carrying out a pre-determined analysis of the signal for rendering in perceptible form comprised in the item of content data. For an audio signal, examples of feature vector co-ordinates include loudness, bass, pitch, brightness, bandwidth and Mel-frequency cepstral coefficients. Other parameter values may be derived from human-generated descriptive information, such as the year of release of an audio track.

Using a classifier, i.e. an algorithm for inferring the similarity of characteristics of the item of content data to characteristics representative of a class, the degree of membership of an item of content data to a particular class can be determined. In one embodiment, the data processing device 2 carries out this determination process. In another embodiment, the data processing device 2 retrieves values of class membership functions determined previously. Generally, the value for an item of content data of a class membership function associated with a class is representative of the probability of that item of content data belonging to that class, but this need not necessarily be the case.

In the following, it will be assumed that a vector v is associated with each item of content data in the collection, with each element in the vector showing (?) a value of the membership function associated with a pre-determined one of a number of classes. Depending on the classes used, the membership functions can have only binary values or real values on a scale (preferably a normalised scale, e.g. from zero to one).

It is observed that the term "class" is used herein to denote a property of an item of content data not necessarily limited to genre or type. For audio files, classes can correspond to artists, year or era of release, etc. In another embodiment, classes can correspond to moods of the listener, e.g. "mellow", "funky", "happy", etc. The classes can also correspond to particular values or value ranges of data representative of use of the items of content data, e.g. playback frequency, date of download, etc. Using the example of classes corresponding to era of release, the membership function value can indicate how a particular item falls into a particular era. Thus, if there are classes corresponding to the Sixties, Seventies, Eighties and Nineties, then an item of content data representative of an audio track released in 1963 might be associated with a vector having values [0.3,0,0,0], for example. In this example, the value of the membership function is not proportional to the probability of membership of the item of content data to the class with which the membership function is associated. This would be different if the classifier were to be based on an analysis of audio tracks for beat and tempo characteristics typical of the respective eras or representative of particular styles of music, such as classical, rock, pop, country, etc. In the latter case, an audio track would generally have characteristics typical of more than one style, and the vector comprised of the membership function values would express the degree to which the audio track's characteristics are typical of the associated styles.

Figure 2:
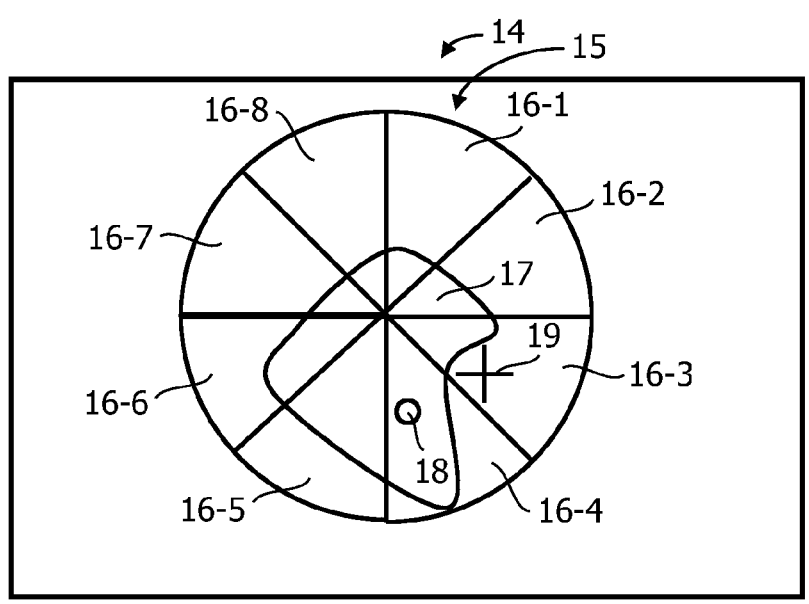
FIG. 2 is a simplified screen shot of the user interface.

FIG. 2 shows a screen shot 14 illustrating the Graphical User Interface (GUI) provided by the data processing system 1 to enable a user to express a preference for a particular combination of classes.

The data processing system 1 generates internally a virtual geometrical construct, partitions it into sections representative of classes and displays a representation of the sections. In one embodiment, the geometrical construct is three-dimensional, e.g. a sphere or cube, and the representation is thus a two-dimensional representation on the screen of the display device 3 of a three-dimensional object. The representation of the sections need not correspond exactly to a representation of the geometrical construct. For example, the representation may be an exploded view of the geometrical construct. However, the mutual relationship between the sections is preserved in the representation.

Relatively little processing power is required if the geometrical construct is two-dimensional, e.g. a polygon or circle. If not the representation of its sections, then at least the geometrical construct itself is connected, but it need not be simply connected. For example, it may be an annulus. In the example, the geometrical construct is a circle 15, partitioned into N circle segments 16-$i$, $i=1, \ldots, N$, where N corresponds to the number of represented classes.

The data processing system 1 provides a GUI for adapting at least one of the shape, size and position of a selection area 17, overlaid on the circle 15. In FIG. 2, the selection area 17 is an amorphous geometrical construct. A cursor 19 controlled by means of a signal from the user input device 4 controls its position and extent. With the cursor 19, the user can drag sections of a boundary of the selection area 17 across the circle segments 16, such that the selection area 17 covers a larger part or smaller part of more or fewer circle segments 16. A dot 18 indicates the position of the centroid of the selection area 17, which is continually recalculated as the boundaries of the selection area 17 change. In alternative embodiments, the selection area 17 is less adaptable, for example when being an ellipse, of which the user can change the position and the lengths of the short and long axes, or change the orientation of the short and long axes (i.e. rotate the ellipse).

The data processing device 2 maintains a mapping between a co-ordinate system attached to the circle 15 and the domain of data indicative of class membership of the items of content data, i.e. the vector space occupied by the vectors of which the elements are values of the membership functions associated with the respective ones of the N classes. Using the mapping, the position and extent of the selection area 17 relative to the area defined by the circle segments 16 are translated into filter criteria for selecting items of content data according to the data indicative of class membership that is associated with the items of content data.

Features of the GUI are aimed at enabling the selection of a preferred (weighted) combination of classes as filter criteria. To facilitate the bypassing of circle segments 16 by the selection area 17, the circle segments 16 are arranged tangentially around a central spot, the centre of the circle 15. The same effect is achievable by appropriately partitioning another polygon, such that section edges shared with a neighbouring section are directed to the central point.

Figure 3:
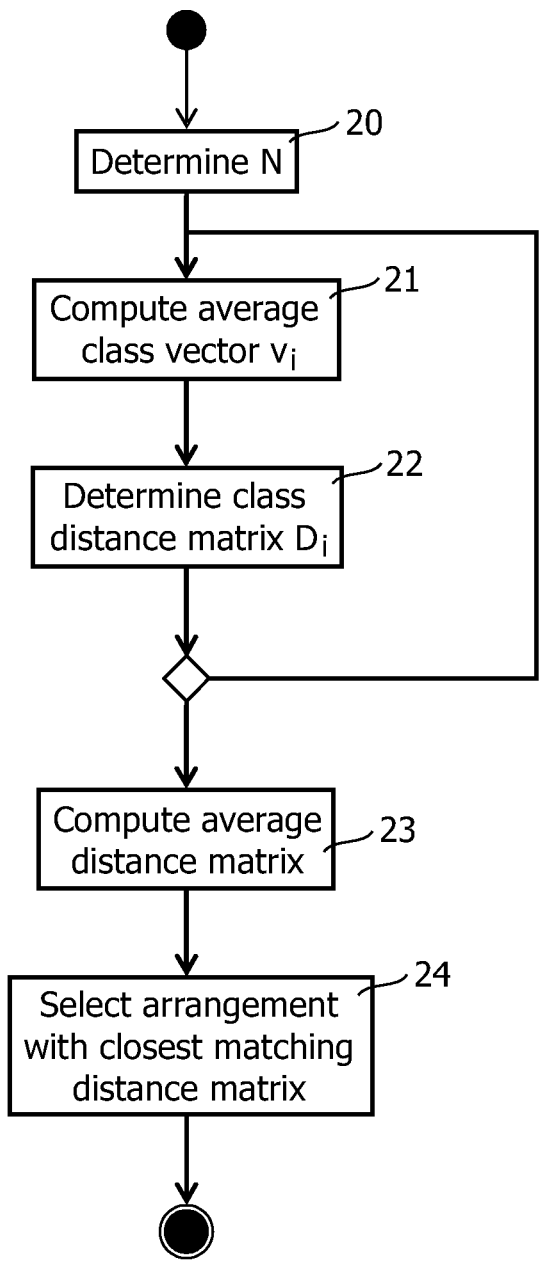
FIG. 3 is a flow chart of a method of generating a display of circle sections as part of the user interface.

The data processing device 2 is also arranged to use an algorithm, such as the one illustrated in FIG. 3, to ensure that circle segments 16 representing classes most likely to be selected in combination are positioned adjacent each other (seen in tangential direction). To this end, the data processing device 2 analyses the data indicative of class membership provided with the items of content data in the collection to which access is provided.

In a first step 20, the classes to which at least a minimum number of items of content data in the collection have at least a minimum degree of membership are determined. Either the minimum number or the minimum degree, or both, may have the value zero. That is to say that, where the minimum number is zero, this step 20 includes determining the identities of all the classes with an associated membership function of which at least one item of content data has a membership function value of more than zero or more than a certain minimum. The circle 15 is partitioned into a corresponding number N of circle segments 16. Thus, where pre-defined classes are used, pre-defined classes having no members in the collection of items of content data are not represented.

It is assumed that each item of content data has associated with it a vector v[n], n=1, . . . , N, where v[n] indicates the probability of that item belonging to class n. For each class i, those vectors v for which v[i]≥v[j], ∀j≠i are selected and the average class vector $v^{(i)}$ for those selected vectors v is computed (step 21).

Next (step 22), the elements of the average class vector $v^{(i)}$ for that class are sorted in decreasing order of element values, and a distance matrix is computed for that class, such that the segments 16 representing the classes closest together in the order of element values are also closest together in the tangential direction (in terms of the number of circle segments 16 separating them). For example, if the average class vector for the second class is: $v^{(2)}$=[0.2,0.8,0.3,0.4], then the order of indices would be: 2-4-3-1. The distance matrix for the second class then is:

$$D_2 = \begin{bmatrix} 0 & 2 & 1 & 1 \\ 2 & 0 & 1 & 1 \\ 1 & 1 & 0 & 1 \\ 1 & 1 & 1 & 0 \end{bmatrix}.$$

The two steps 21,22 are repeated for each class i, i=1, . . . , N.

Then, an average distance matrix $\overline{D}$ is computed (step 23), which is the average of all the distance matrices $D_i$ computed in the preceding step 22.

Then (step 24), distance matrices $\delta_a$ for each possible assignment a of four classes to four segments 16 are compared to the average distance matrix $\overline{D}$, to minimise the error:

$$e_a = \|\delta_a - \overline{D}\|.$$

That assignment a for which $e_a$ is minimal is chosen as the assignment of classes to circle segments 16.

Figure 4:
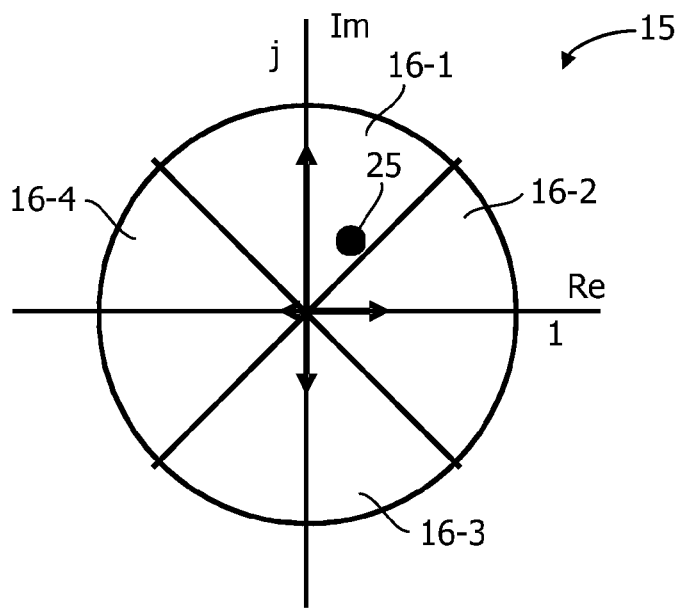
FIG. 4 is a diagram for illustrating a mapping between positions on the circle sections and class membership function values of items of content data.
Figure 5:
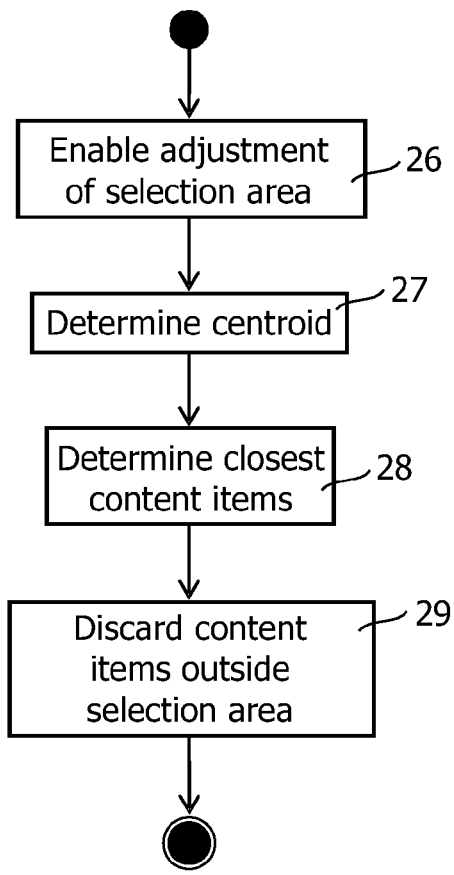
FIG. 5 is a flow chart illustrating a first method of selecting items of content data.

A way of selecting items of content data according to criteria represented by the selection area 17 is illustrated in FIGS. 4 and 5. In general, values for mapping to a set of values indicating degrees of membership of at least those classes represented by circle segments 16 on which the selection area 17 is overlaid are associated with the selection area 17. Then, items of content data determined to have membership function values corresponding most closely to the values associated with the selection area 17 are selected. In one embodiment, values representing the position of the selection area 17 relative to the circle 15 are mapped to the domain of values of the class membership functions. However, in the illustrated method, the opposite is done. Class membership function values associated with items of content data are mapped to a co-ordinate system associated with the circle 15, and distances are computed within that co-ordinate system.

Thus, referring to FIG. 4, a dot 25 representing an item of content data is placed at a position corresponding to the end point of a vector o that is the sum of individual vectors in respective circle segments. Each of those individual vectors has a length $p_i$ and is oriented along a bisector of the segment, where $p_i$ is the membership function value for class i. In the co-ordinate system illustrated in FIG. 4, the vector o associated with the item of content data is given by the following formula:

$$o = \sum_{i=0}^{N-1} p_i \left( \cos\left(\frac{2\pi i}{N}\right) + j\sin\left(\frac{2\pi i}{N}\right) \right),$$

where N is the number of classes, and thus the number of circle segments 16. As an example, where the class vector v associated with an item of content data is [0.3,0.8,0.1,0.4], the position associated with the item of content data in the co-ordinate system associated with the circle 15 is 0.2+0.4j.

Turning to FIG. 5, the selection proceeds as follows. First (step 26), a user is allowed to adjust the selection area 17. Then, the position of the centroid of the selection area 17, represented by the dot 18, is determined (step 27). Then (step 28), the items of content data associated with membership function values that, when mapped to the co-ordinate system associated with the circle 15, are closest to the centroid position are selected. In the illustrated embodiment, only those that are within the contours of the selection area 17 are selected. Others are discarded (step 29). In this way, the extent of the selection area 17 also influences the selection process.

In an alternative embodiment, the step 27 of determining the location of the centroid of the selection area 17 is not carried out. Instead, all items of content data associated with a combination of membership function values that, according to the mapping between the co-ordinate system associated with the circle 15 and the domain of membership function values, lie within the selection area 17 are selected.

In another alternative embodiment, the degrees of overlap between the selection area 17 and the circle segments 16 on which the representation of the selection area 17 is overlaid are determined. This set of values forms a vector indicating a position in the class membership vector space, and the items of content data associated with a class membership vector closest to that position are selected.

An example of this embodiment involves the use of items of content data, e.g. audio tracks, linked to a set of membership function values indicating the degrees of membership of a set of classes, e.g. pop, rock, classical, country, jazz, R&B. A user can adjust the selection area 17 to cover, for instance, 20% of a circle segment 16 assigned to the class "Rock" and 30% of a circle segment assigned to the class "Pop". The data processing device 2 then selects all audio tracks linked to a set of membership function values within a pre-determined distance to the values {0.2, 0.3}.

In yet another embodiment, the degrees of overlap between the selection area 17 and the circle segments 16 on which the representation of the selection area 17 is overlaid are also determined. However, in this embodiment, the items of content data are selected according to the class to which they have the highest probability of membership, such that the proportions of content items predominantly in the various classes correspond to the distribution of the values of the degrees of overlap with the circle segments 16 representing those classes.

An example of this embodiment again involves the use of items of content data, e.g. audio tracks, linked to a set of membership function values indicating the degrees of membership of a set of classes, e.g. pop, rock, classical, country, jazz, R&B. A user can adjust the selection area 17 to cover, for instance, 20% of a circle segment 16 assigned to the class "Rock" and 30% of a circle segment assigned to the class "Pop". In this embodiment, a collection of audio tracks is formed, such that the ratio of audio tracks that are predominantly "Pop" to those that are predominantly "Rock" is 3:2.

In each of the embodiments discussed above, a GUI is provided that enables the filter criteria to be set in an intuitive manner requiring a small number of actions on the part of the user. The filter criteria represent a preferred combination of classes as opposed to a single class.

It should be noted that the embodiments described above illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The items of content data can include audio data or video data or a mix of these, for example. Class membership function values can be binary or on a continuous scale. Although it has been described herein that class membership function values are obtainable through the use of probabilistic classifiers associated with the classes, also other methods can be used to obtain class membership function values.

'Means', as will be apparent to a person skilled in the art, are meant to include any hardware (such as separate or integrated circuits or electronic elements) or software (such as programs or parts of programs) which perform in operation or are designed to perform a specified function, be it independently or in conjunction with other functions, be it in isolation or in co-operation with other elements. 'Computer programme' is to be understood to mean any software product stored on a computer-readable medium, such as an optical disk, downloadable via a network, such as the Internet, or marketable in any other manner.

The invention claimed is:

1. A method of selecting a plurality of items of content classified in a plurality of content classes, the method comprising acts of:
   associating to each item of content a value indicating a membership in one of the plurality of content classes;
   displaying a geometrical construct representing the plurality of content classes, attached to a co-ordinate system and occupying at least one-dimensional space;
   partitioning the geometrical construct into a plurality of sections representing two or more of the plurality of content classes;
   defining a sub-space within the geometrical construct as a selection area;
   assigning to each of the plurality of sections a degree value indicating a membership within the selection area; and
   selecting at least one item of content having the value corresponding to the plurality of content classes represented by the plurality of sections within the selection area.

2. The method according to claim 1, further comprising an act of providing a graphical user interface for displaying at least one of shape, size and position of the geometrical construct and the selection area.

3. The method according to claim 1, wherein the plurality of sections is arranged tangentially around a central spot.

4. The method according to claim 1, further comprising acts of:
   analyzing the values to identify correlations between the plurality of items of content and the plurality of content classes; and
   assigning the plurality of sections to the plurality of content classes,
   wherein the assigning act maximizes a probability that combinations of the plurality of content classes of which the membership are most likely to have a highest combination of values for any item of content are assigned to adjacent sections.

5. The method according to claim 1, wherein the selected items of content have the membership corresponding most closely to the values associated with the selection area.

6. The method according to claim 1, further comprising an act of mapping the class membership according to one of:
   a position of a centroid of the selection area relative to the plurality of sections, and
   degrees of overlap between the selection area and the plurality of sections on which the representation of the selection area is overlaid.

7. The method according to claim 1, wherein the plurality of sections correspond to classes in which at least a minimum number of items of content have membership.

8. The method according to claim 1, wherein the geometrical construct is at least two-dimensional.

9. A system for selecting a plurality of items of content classified in a plurality of content classes, the system comprising:
   a display to display a geometrical construct representing the plurality of content classes and a selection area;
   a user interface for obtaining and providing a signal indicating the selection area; and
   a computing device configured to:
      associate a value indicating a membership in the at least one of the plurality of content classes for each item of content,
      generate the geometrical construct representing the plurality of content classes, attached to a co-ordinate system and occupying at least one-dimensional space,
      partition the geometrical construct into a plurality of sections representing two or more of the plurality of content classes,
      define a sub-space within a portion of the geometrical construct as the selection area,
      assign to each of the plurality of sections a degree value indicating a membership within the selection area, and
      select at least one item of content having the value corresponding to the plurality of content classes represented by the plurality of sections within the selection area.

10. The system according to claim 9, wherein a size of each of the plurality of sections on the display is proportional to a number of content items associated with a content class represented by each of the plurality of sections.

11. A non-transitory computer readable medium comprising computer instructions which, when executed by a processor, configure the processor to perform a method of selecting a plurality of items of content classified in a plurality of content classes, the method comprising acts of:
   associating to each item of content a value indicating a membership in one of the plurality of content classes;
   displaying a geometrical construct representing the plurality of content classes, attached to a co-ordinate system and occupying at least one-dimensional space;

partitioning the geometrical construct into a plurality of sections representing two or more the plurality of content classes;

defining a sub-space within the geometrical construct as a selection area;

assigning to each of the plurality of sections a degree value indicating a membership within the selection area; and selecting at least one item of content having the value corresponding to the plurality of content classes represented by the plurality of sections within selection area.

12. The method according to claim 1, wherein a size of each of the plurality of sections on the display is proportional to a number of content items associated with a content class represented by each of the plurality of sections.

* * * * *